Aug. 12, 1969          R. A. BETH          3,461,410
2-n POLE ELECTROMAGNET FOR FOCUSING CHARGED PARTICLES
Filed Aug. 21, 1967                    3 Sheets-Sheet 1

INVENTOR.
RICHARD A. BETH
BY
Roland A. Anderson

CROSS SECTIONAL VIEW OF SUPERCONDUCTING QUADRUPOLE

INVENTOR.
RICHARD A. BETH

United States Patent Office 3,461,410
Patented Aug. 12, 1969

3,461,410
2-n POLE ELECTROMAGNET FOR FOCUSING CHARGED PARTICLES
Richard A. Beth, Bellport, N.Y., assignor to the United States of America as represented by the United States Atomic Energy Commission
Filed Aug. 21, 1967, Ser. No. 662,207
Int. Cl H01f 7/22
U.S. Cl. 335—210                                    5 Claims

ABSTRACT OF THE DISCLOSURE

A direct current multipole magnet for generating a strong, uniform field gradient, charged particle focusing, 2-n pole, magnetic field within current sheets defining a cylindrical aperture having a high magnetic external field cancelling member that enhances the field strength and preserves the field shape and form inside the magnet.

CROSS-REFERENCE TO RELATED APPLICATIONS

Ser. No. 507,256, now U.S. Patent No. 3,356,976, filed: Nov. 10, 1965, by Sampson et al.; Ser. No. 591,056, now U.S. Patent No. 3,423,706, filed Oct. 28, 1966, by Sampson et al.; Ser. No. 626,674, filed: Mar. 27, 1967, by Richard A. Beth.

BACKGROUND OF THE INVENTION

In high energy physics, it is often desirable to cancel the external fields around charged particle focusing magnets having an aperture for transporting high energy charged particles up to several billion electron volts. Various proposals have been made and used to accomplish such external field cancellation, comprising the arrangements shown in application Ser. No. 626,674, filed Mar. 27, 1967, by the inventor of this application, and assigned to the assignee thereof. While these arrangements are useful and can accomplish the desired external field cancellation, they do require the manufacture and assembly of particular, external 2-n pole electromagnets in which electrical energy source means and/or additional external cryostatic cooling means are required. It is additionally advantageous to increase the strength of the field along the axis of particle transporting 2-n pole magnets, while preserving the shape and form thereof.

SUMMARY OF THE INVENTION

This invention was made in the course of, or under a contract with the United States Atomic Energy Commission.

By this invention, there is provided a simple and effective method and apparatus for the cancellation of external fields around particular, constant, high field gradient, 2-n pole, direct current electromagnets having cylindrical, longitudinally extending, current sheets running parallel to the axis of the aperture formed thereby for transporting and focusing charged particles in the multiple Bev range, such as are produced by the Brookhaven Alternating Gradient Synchrotron. The method and construction involved in this invention utilize standard and well known techniques and apparatus and are high flexible for a wide range of 2-n pole multiple magnets, aperture sizes and shapes, and magnetic field strengths. More particularly this invention involves the use of a uniform, magnetically permeable, right-circular, cylindrical, magnetic member around an active, internal, direct current, 2-n pole electromagnet to control the field lines within a confined volume. The system of elements is arranged in one embodiment, with laminations in the outer element for high efficiency and simple and effective manufacture and assembly. With the proper selection of elements, as described in more detail hereinafter, the desired external field cancellation and field enhancement of the desired shape are achieved inside the magnet aperture all along its axis. In another aspect this invention provides a compact structure with provision for effective cooling of the magnet to superconducting temperatures and the reduction of the force on the coil windings.

It is an object of this invention, therefore, to provide high strength, uniform high field gradient magnets for focusing charged particles;

It is a further object to provide a simple and effective method and apparatus for the cancellation of external fields around particular, cylindrical, 2-n pole magnets by providing a low reluctance, magnetic field transmitting, high magnetic permeability, external field cancelling member;

It is a further object to provide a means for cancelling the external magnetic field in such a way as to enhance the strength of the field along the axis of the magnet;

It is a further object to provide means that will cause the least interference with the shape and form of cylindrical, uniform field gradient, 2-n pole magnetic fields in a longitudinally extending particle transmitting aperture formed by current sheets parallel with the aperture axis;

It is a still further object to provide for the simple, effective, compact, and inexpensive manufacture and assembly of 2-n pole magnets and their operation at superconducting temperatures.

The above and further objects and novel features of this invention will appear more fully from the following detailed description when the same is read in connection with the accompanying drawings. It is expressly understood, however, that the drawings are not intended as a definition of the invention but are intended for the purpose of illustration only.

BRIEF DESCRIPTION OF THE DRAWINGS

In the drawings where like elements are referenced alike:

FIG. 1c is a partial detailed view of the confining means for the current sheets of FIG. 1a;

DESCRIPTION OF THE PREFERRED EMBODIMENT

Magnets for focusing high energy charged particles have generally departed from engineering experience primarily in the need for precise shaping of the fields in an air gap that sets rigorous requirements on the field inside the gap. In contrast, this feature has been of less concern in engineering applications, where the detailed shape of the field is seldom important and gaps in iron circuits are deliberately minimized. Also, difficulties in designing these magnets have been troublesome heretofore in view of the difficulties in calculating the non-linear characteristics of iron at high fluxes, since the permeability thereof is a strong function of flux density and has resulted in extremely complicated magnetic circuits at the high magnetic fields required therefor. By providing 2-n pole magnets without iron cores, such as described in the above cited co-pending applications by Sampson et al., many of these difficulties have been avoided while precise, high field gradients have been provided. These particular magnets, however, have produced widely extending magnetic field lines running through the space around the magnet due to the high field strength capabilities of these magnets and the lack of iron cores therein. It has thus been difficult or impossible efficiently and effectively to utilize the space around these particular magnets so as to provide access for magnetic field sensitive equipment or for the use of auxiliary injection or extraction magnets in close proximity to the evacuated beam tube for the charged particles travelling along the axis of the magnets. It has also been advantageous effectively to cool these magnets in a compact space and to enhance the field shape and strength therein in a stable configuration.

Figure 1A:
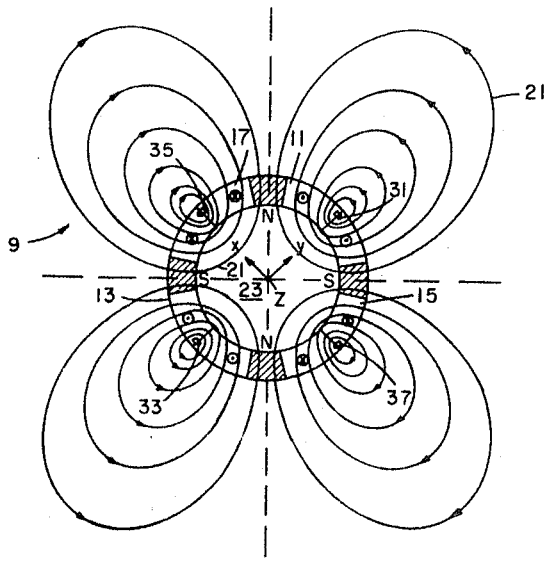
FIG. 1a is a partial cross-section of a 2-n pole magnet having longitudinally extending current sheets running parallel to the axis of an aperture formed thereby.

Referring to FIG. 1a, a typical 2-n pole iron coreless quadrupole magnet 9 is shown in which a system of cylindrical current sheets 11, 13, 15 and 17 provide opposite north poles in a first plane N—N passing through the magnet axis Z, and two opposite south poles in a second plane S—S passing through the Z axis at right angles to the first plane and disposed at 45° to respective X and Y planes. To this end the current sheets 11 and 13 conduct currents longitudinally in one direction and current sheets 15 and 17 conduct like currents oppositely. This is illustrated for ease of explanation by a dot in a circle to indicate current flow normally up from the plane of the drawing of FIG. 1a and by a cross in a circle to indicate the opposite current flow. The field lines 21 that produce the desired constant or uniform, precise high gradient focusing field inside magnet aperture 23, normally have widely extending counterparts outside and around the circumference of the magnet 9.

The magnetic field lines of force 21 in the adjacent four quadrants of the particular quadrupole of FIG. 1a circulate in closed or endless loops in opposite directions. Thus the field lines 21 intersect the X plane normally in a clockwise direction and the field lines intersect the Y plane normally in a counter-clockwise direction. At the interface planes between the respective adjacent quadrants, however, the field lines 21 rotate in the same direction with the field lines rotating inwardly toward the Z axis of aperture 23 to form the opposite south poles intermediate the north poles. Also, the field lines uniformly bunch against each other inside the current sheets in aperture 23 to provide the desired particular uniform or constant gradient magnet field therein and the normally widely diverging co-aaxial loops 21 that are normally widely and outwardly eccentrically off-centered from null points 31, 33, 35 and 337.

Figure 1B:
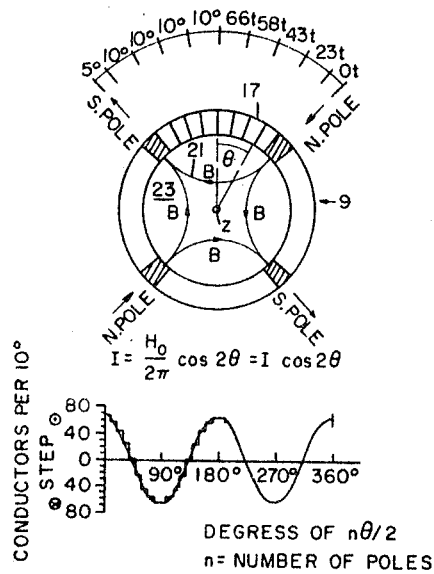
FIG. 1b is a partial schematic diagram of a stepping arrangement for the conducting ribbons in the current sheets of FIG. 1a for producing a uniform gradient quadrupole field in the aperture thereof.
Figure 1C:
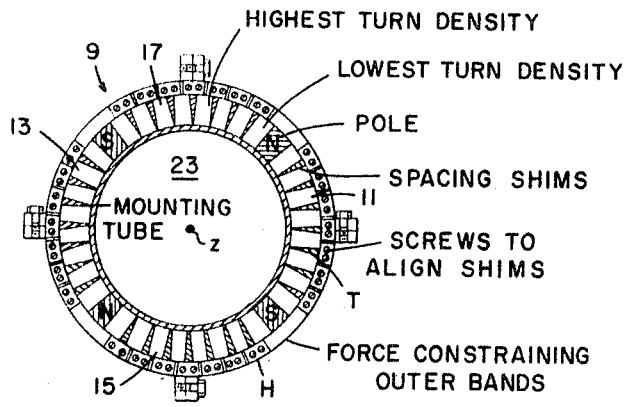

Advantageously, the magnet 9 comprises particular continuous, rectangular cross-section, superconductor ribbons wound with normal resistance conductors layered thereon into adjacent coils with the width of the ribbon directed toward the central magnet axis Z in aperture 23 and with the coils having suitable direct current series energization from a suitable source (not shown). Each coil provides two legs respectively forming one half of one of the described current sheets with the current thus being oppositely directed in the respective legs of each coil and thus also in the adjacent current sheets. Suitable thickness shims between the ribbon turns in a series of steps provide the desired high current density for producing the desired particular, high, uniform field gradient, multipole magnetic field in a right-circular cylindrical aperture 23. FIG. 1b illustrates a suitable stepping arrangement for the shims to provide the desired current density for providing the uniform gradient quadrupole field in aperture 23. As shown in FIG. 1c, an annular array of tapered blades T are disposed periodically at each step interval inside annular stainless steel hoops H around the circumference of magnet 9 to make a high current density assembly wherein the force of the magnet coils interact between the coils and between the coils and the bands around the circumference of the magnet when the coils are energized.

The invention hereinafter described utilizes a multipole magnet 9 of the type described in which a cylindrical space around the magnet, which normally has widely extending external magnetic field lines running therethrough, is provided with a uniform, low reluctance, high magnetically permeable path that circumscribes a space around magnet 9 in a manner described in more detail hereinafter in connection with particular configurations of these magnets. A mathematical treatment of the principles involved in this invention is given in my article of 3/19/66 in Brookhaven National Laboratory, Report BNL 10587 (AADD–119) entitled "Magnetic Materials in Two-Dimensional Fields," which was released for publication on Sept. 15, 1966.

In order to explain how the method and apparatus of this invention accomplishes the function of cancelling the external fields while enhancing the strength and preserving the shape of the constant gradient multiple field in aperture 23, a complex "magnetic interface theorem" for treating two dimensional magnetic fields at a cylindrical interface between media of differing permeability may be formulated. Consider a two-dimensional vector field B having components, $B_X = B_X(X, Y)$ and $B_Y = B_Y(X, Y)$ with real cartesian coordinates X and Y assumed to be independent of the conventional third space coordinate perpendicular to the X, Y plane.

Defining Z and B as the complex combinations $Z = X + iY$ and $B = B_Y + iB_X$, one way to assay B for analyticity as a function of Z is to evaluate the line integral $\oint B\,dz$ around a closed path in the Z-plane. Let the path be $Z = z(s) = x(s) + iy(s)$ as a function of the distance $s$ along the path. If $\theta$ is the inclination of the tangent to the path at some point, $$dz = \left(\frac{dx}{ds} + i\frac{dy}{ds}\right)ds = (\cos\theta + i\sin\theta)ds = e^{i\theta}ds$$

and hence $$B\,dz = (B_Y + iB_X)(\cos\theta + i\sin\theta)ds$$
$$= [(B_Y\cos\theta - B_X\sin\theta) + i(B_X\cos\theta + B_Y\sin\theta)]ds$$
$$= (B_n + iB_s)ds \qquad (4)$$

where $B_n$ and $B_s$ are the components of B normal and tangential to the path.

When the vector B is the magnetic induction (gauss) and when we write $dI$ and $dJ$ abamperes, respectively, for the true and Amperian currents normal to the Z-plane through the area element $dX\,dY$, we find, since div $B = 0$ and (curl B)$_Z$ $dX\,dY = 4\pi(dI + dJ)$ by Maxwell's equations, $$\oint B\,dz = 4\pi i(I + J) \qquad (6)$$

where I is the total true current through the area enclosed by the contour and J the total Amperian current through the enclosed area.

We may also perform the same analysis with the vector $H = H_Y + iH_X$ representing the magnetic field strength (oersteds). By Maxwell's equations (curl H)$_Z$ $$dX\,dY = 4\pi\,dI$$

and as sources for H we visualize an infinite column with cross section $dX\,dY$ of north pole strength, $dP$, such that $$\text{div } H\,dX\,dY = 4\pi\,dP$$

Then $$\oint H\,dz = 4\pi i(I + iP) \qquad (7)$$

Thus for the H field a "pole filament" plays the role of an imaginary current filament and the total residue of $H = H_Y + iH_X$ within a contour is $2(I + iP)$ through the enclosed area.

We may also consider the vector M representing magnetic moment per unit volume; in electromagnetic (gaussian) units $$B = H + 4\pi M$$

Considering further a simply connected region of constant permeability $\mu$, $B = \mu H$ and curl $B =$ curl $\mu H = \mu$ curl $H$; therefore $dJ = 0$, i.e., the Amperian currents are zero, and in the absence of true currents, $\oint B dz = 0$ for any closed path within the region. Then $$B = B(Z) = \mu H(Z) = \frac{4\pi\mu}{\mu - 1} M(Z)$$

and the indefinite integrals $$\int B dZ = \mu \int H dZ = \frac{4\pi\mu}{\mu - 1} \int M dZ = W(Z) - W_0 \quad (10)$$

are all analytic functions of $Z$ within any simply connected region of constant permeability.

Consider further integrals, like (6) and (7), of $B$ and $H$ around a closed path enclosing an interface interval from $z_0$ to $z = z_0 + \Delta z$, and let the enclosed Amperian current and pole strength be $\Delta J = J - J_0$ and $\Delta P = P - P_0$, respectively. Each path integral consists of two parts, and each part runs wholly within a constant permeability region so that, by (10) each part depends only on the end points $z_0$ and $z$. Hence $$\int_{z_0}^{z} B_R dZ = \mu_R \int_{z_0}^{z} H_R dZ = W_R(z) - W_R(z_0)$$

$$\int_{z}^{z_0} B_L dZ = \mu_L \int_{z}^{z_0} H_L dZ = -W_L(z) + W_L(z_0)$$

The integrals, (4) and (6), are obtained by addition of the appropriate parts, $$\oint B dZ = W_R(z) - W_L(z) + C_1 = 4\pi i \Delta J = \text{imaginary} \quad (11a)$$

$$\oint H dZ = \frac{W_R(z)}{\mu_R} - \frac{W_L(z)}{\mu_L} + C_2 = -4\pi \Delta P = \text{real} \quad (11b)$$

where $$C_1 = -[W_R(z_0) - W_L(z_0)]$$

$$C_2 = -\left[\frac{W_R(z_0)}{\mu_R} - \frac{W_L(z_0)}{\mu_L}\right]$$

are constants, independent of $z$.

Figure 2:
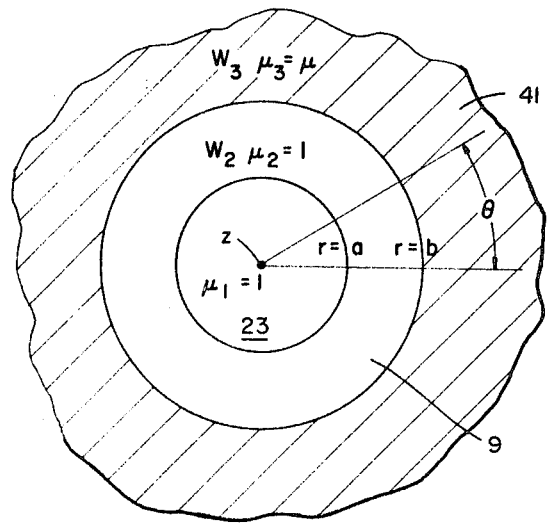
FIG. 2 is a partial schematic illustration of the interface between the right circular, cylindrical current sheet of FIG. 1 surrounded by a correspondingly shaped magnetic material of constant permeability.

The application of these theorems (11), to find the current required on a circular cylindrical current sheet at $r = a$, when surrounded by a magnetic material of constant permeability $\mu$ in the region $r \geq b$, to produce an interior 2-n pole field $W_1(Z) = Z^n$ in the region $r < a$ is illustrated in FIG. 2.

Since we are dealing with a pure multipole we may expect the exterior field $W_3$ to fall off with $Z^{-n}$ and, therefore, that $W_2$ would be a mixture of $Z^n$ and $Z^{-n}$. Hence we postulate $$W_2(Z) = \alpha Z^n + \beta Z^{-n}$$

$$W_3(Z) = \gamma Z^{-n} \quad (12)$$

and seek to find the coefficients $\alpha$, $\beta$, and $\gamma$ in terms of $a$, $b$, $\mu$ and $n$.

With $Z = re^{i\theta}$ the current sheet theorem at $r = a$ and the magnetic interface theorem at $r = b$ yield the relations $$(\alpha a^n e^{in\theta} + \beta a^{-n} e^{-in\theta}) - a^n e^{in\theta} = 4\pi i I(\theta)$$

$$\gamma b^{-n} e^{-in\theta} - (\alpha b^n e^{in\theta} + \beta b^{-n} e^{in\theta}) = 4\pi i J(\theta)$$

$$\frac{\gamma}{\mu} b^{-n} e^{-in\theta} - (\alpha b^n e^{in\theta} + \beta b^{-n} e^{-in\theta}) = -4\pi P(\theta) \quad (13)$$

Hence the real parts of the first two equations and the imaginary part of the last must be zero for all $\theta$:

$$\cos n\theta (\alpha a^n + \beta a^{-n} - a^n) = 0$$

$$\cos n\theta (\gamma b^{-n} - \alpha b^n - \beta b^{-n}) = 0$$

$$\sin n\theta \left(-\frac{\gamma}{\mu} b^{-n} - \alpha b^n + \beta b^{-n}\right) = 0$$

Hence we find $$\alpha = \frac{\mu - 1}{2\mu} b^{-2n} \gamma$$

$$\beta = \frac{\mu + 1}{2\mu} \gamma$$

$$\gamma = \frac{2\mu}{(\mu + 1) a^{-2n} + (\mu - 1) b^{-2n}} \quad (14)$$

where, for convenience, $\alpha$ and $\beta$ have been expressed in terms of the solution for $\gamma$ given in the last line. From (13) we then obtain $$4\pi I(\theta) = -\left(\frac{\mu + 1}{\mu}\right) a^{-n} \gamma \sin n\theta$$

$$4\pi J(\theta) = -\left(\frac{\mu - 1}{\mu}\right) b^{-n} \gamma \sin n\theta$$

$$4\pi P(\theta) = \left(\frac{\mu - 1}{\mu}\right) b^{-n} \gamma \cos n\theta \quad (15)$$

for the required current, $I(\theta)$, at $r = a$ and the resulting Amperian current, $J(\theta)$, and pole strength, $P(\theta)$, at $r = b$.

By (10) the magnetic inductions, $$B = B_Y + iB_X = dW/dZ$$

and magnetic field strengths, $H = H_Y + iH_X$, in the three regions are $$B_1 = H_1 = nZ^{n-1}$$

$$B_2 = B_2 = n(\alpha Z^{n-1} - \beta Z^{-n-1}) \quad (16)$$

$$B_3 = \mu H_3 = -n\gamma Z^{-n-1}$$

From the first of Equations 15 we may compare the current sheet required at $r = a$ to produce the internal field $W_1 = Z^n$ when tightly surrounded by material of permeability $\mu$ (for $b = a$, $\gamma = a^{2n}$):

$$4\pi I(\theta) = -\left(\frac{\mu + 1}{\mu}\right) a^n \sin n\theta$$

with that required in the absense of permeable material ($\mu = 1$ or, alternatively, $b \to \infty$):

$$4\pi I(\theta) = -2a^n \sin n\theta$$

In other words, a tight magnetic shell of large extent reduces the required current sheet by the factor $(\mu + 1)/2\mu$ to produce the same internal field; for large $\mu$ this factor approaches one half.

Figure 3:
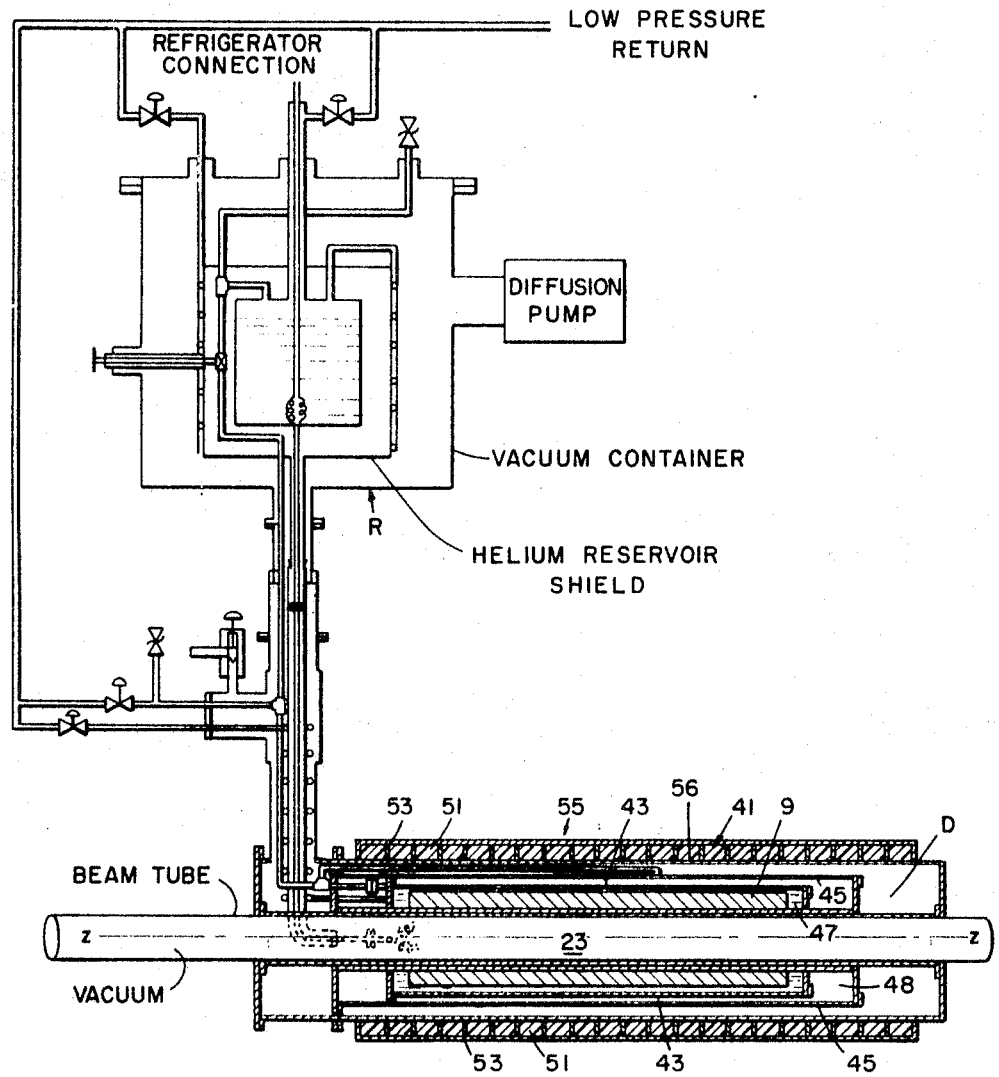
FIG. 3 is a partial cross-section of the 2-n pole magnet of FIG. 1 with an external field cancellation member and cooling system in accordance with this invention.

Referring to FIG. 3, in a practical embodiment field cancellation cylinder 41 has a right circular cylindrical configuration having an inside diameter greater than the outside diameter of a right circular cylindrical magnet 9 disposed therein. Advantageously, cylinder 41 has inner, non-magnetic, co-axial cylinders forming a Dewar D. For example, a high specific heat, heat shielding cylinder, such as copper cylinder 43 and a stainless steel cylinder 45 are provided around magnet 9. The outside of cylinder 43 between it and cylinder 45 forms a closed evacuated space 48 around the evacuated beam tube B inside magnet 9. The inside of cylinder 43 forms a closed space 47 between it and magnet 9 for the circulation of a cooling fluid, such as liquid helium, directly against the outside of the current sheets formed by magnet 9 and the outer edges of the superconductor ribbons thereof thus to maintain the superconducting ribbon shaped conductor thereof in its superconducting state. To this end, the liquid helium, which has a low viscosity, penetrates the current sheets along the outer sides thereof, the fluid being circulated from liquid helium reservoir R.

The cylinder 41 advantageously comprises uniform cross-section annular discs 51 that are stacked co-axially with thin electrical insulators 53 therebetween along the Z axis of magnet 9, for example made of polyester, so as to prevent field line circulation longitudinally parallel to the z axis is cylinder 41. Also, this provides for the efficient manufacture and assembly of cylinder 41 around magnet 9 with uniform permeability, the discs being shuffled to this end. The faces of the discs 51 are ground and lapped to provide flat parallel surfaces and the outsides thereof may be potted with an epoxy resin to hold the discs together in assembly 55 and to seal the inside of assembly 55 against spacer cylinder 56.

In operation, an external iron cylinder 41 having a saturation of flux density B in gauss of about 14,000 to 21,000 and a thickness of only one inch will cancel the external field around a magnet 9 disposed therein to produce an internal field of over 50 kg. To this end cylinder 41 extends one inside diameter of the magnet 9 beyond each end thereof and has an inside diameter with a ratio of 2:1 to the inside diameter of magnet 9. In one embodiment, for example, the length of magnet 9 is two feet and the cylinder 41 extends five inches beyond the ends of magnet 9. Also, in this embodiment, the inside diameters of magnet 9 and cylinder 41 are 5" and 10" respectively and the outside diameters thereof are 10" and 12" respectively. With a one inch thick cylinder 41, the field increase in aperture 23 is up to about 5% while the field shape therein is preserved. This results because cylinder 41 lowers the reluctance of the field lines 21 outside magnet 9 while the cylinder 41 is spaced far enough from the magnet 9 to maintain the permeability of the iron in cylinder 41 substantially constant over the field range of from 0–5 kilogauss. Moreover, the magnetic force on the coil windings is reduced to provide a stable, compact configuration with light weight hoops H. Additionally, the large iron mass of the external field cancellation cylinder 41 is outside the cooling area of Dewar D, whereby the efficiency thereof is high.

This invention has the advantage of providing a simple, effective system for producing a precise high field, high uniform field gradient 2-n pole magnetic field for focusing charged particles in a longitudinally extending aperture while substantially reducing or eliminating external fields. Moreover, this invention provides for external field cancelling means that is simple and effective to manufacture and assemble and that provides for the stable, effective and efficient cooling and operation of superconductor magnet coils therein.

What is claimed is:

1. In a transverse field producing 2-n pole magnet having a stabilized superconductor ribbon adapted to provide a plurality of separate, parallel, longitudinally extending, fixed current paths in side-by-side annular coils arranged with side-by-side legs having side-by-side turns connected therein in a single longitudinally extending cylindrical current sheet uniformly disposed between equi-distant inner and outer co-axial cylindrical surfaces formed by said current sheet, said turns in said side-by-side legs being sequentially shim stepped around the periphery of said inner cylindrical surface in accordance with a stepped current sheet function, and having cryogenic cooling means around said current sheet for maintaining said turns therein in a superconducting state while permitting the passage of charged particles through said transverse field of said 2-n pole magnet along the axis of said cylindrical surfaces, the improvement, comprising a laminated, magnetically permeable, low reluctance cylindrical field enhancing means around said cryogenic cooling means and uniformly extending longitudinally co-axially, parallel with and around the outside periphery of said outer cylindrical surface of said current sheet and beyond the opposite ends thereof for uniformly enhancing said transverse field produced by said 2-n pole magnet inside said inner cylindrical surface by uniformly increasing the strength of said transverse field above the strength thereof inside said inner cylindrical surface that would be produced by said current sheet alone.

2. The invention of claim 1 in which said cylindrical field enhancing means, comprises annular discs having thin electrical insulators sandwiched therebetween, which are made from polyester so as to prevent field line circulation longitudinally parallel to the axis of said cylindrical surfaces, said discs being co-axial with said cylindrical surfaces, being ground and lapped to provide flat parallel surfaces normal to the axis of said cylindrical surfaces, and being shuffled and stacked to provide substantially uniform magnetic permeability, said discs also being potted in epoxy resin for extending up to five inches beyond the end of said current sheet.

3. The invention of claim 1 in which said cryogenic cooling means has an evacuated non-magnetic charge particle transporting tube inside said inner cylindrical surface in said magnet, and, connected to said tube, an annular, cylindrical, non-magnetic spacer means forming, on one side thereof, an evacuated chamber inside, adjacent to, and coaxial with said field enhancing means, and forming, on the other side thereof, a Dewar chamber on the outsid of said 2-n pole magnet and adjacent said outer cylindrical surface for the circulation of a cryostatic cooling fluid through said Dewar and against said superconducting turns of said magnet, whereby said charged particles may be received and transported through said tube inside said magnet in a vacuum and a large uniformly enhanced transverse field can be produced by said superconductor and inside said inner cylindrical surface for focusing a high energy charged particle beam circulating along an endless axis in said tube.

4. The invention of claim 1 in which said cylindrical field enhancing means, comprises a plurality of uniform cross-section, parallel, co-axial, discs that are shuffled and randomly stacked, have a magnetic saturation of at least 14 kg., have thin electrical insulators therebetween, and are uniformly and co-axially spaced from said outer cylindrical surface of said current sheet of said magnet a distance sufficient to provide a substantially linear permeability in said cylindrical field enhancing means from 0–5 kg.

5. The invention of claim 1 in which said cylindrical field enhancing means has a thickness and spacing from said outer cylindrical surface of said current sheet of said magnet so as to provide ratio of 2:1 between the inside diameters of said cylindrical eld enhancing means and said inner cylindrical surface, thereby to enhance the field strength inside said inner cylindrical surface, substantially to decrease the distance of the extension of field lines beyond the outside of said outer cylindrical surface, to preserve the shape and form of said transverse field inside said inner cylindrical surface, and to reduce the internal magnet forces in said magnet so as to enhance the stability thereof.

References Cited

UNITED STATES PATENTS

| | | | |
|---|---|---|---|
| 3,404,306 | 10/1968 | Johnson | 335—210 XR |
| 3,400,350 | 9/1968 | Holtzberg et al. | 335—216 |
| 3,351,754 | 11/1967 | Dietrich et al. | 335—210 XR |
| 3,304,523 | 2/1967 | Jaouen et al. | 335—210 |
| 3,205,415 | 9/1965 | Seki et al. | 335—210 |
| 3,158,774 | 11/1964 | Fleming et al. | 335—210 XR |
| 3,032,678 | 5/1962 | Glaser | 335—210 XR |

FOREIGN PATENTS 1,437,489  3/1966  France.

BERNARD A. GILHEANY, Primary Examiner

DEWITT M. MORGAN, Assistant Examiner

U.S. Cl. X.R.

335—216